DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MARCH 4, 1975

932 O.G. 10

T932,006

SOLUBILIZED MONO AND DISAZO DYES

Hans Alfred Stingl, 852 Ocean View Drive, Toms River, N.J. 08753

Continuation of abandoned application Ser. No. 180,493, Sept. 14, 1971. This application Jan. 7, 1974, Ser. No. 431,517

Int. Cl. C09b *29/10, 29/12, 31/06*

U.S. Cl. 260—163

No Drawing. 38 Pages Specification

Dyestuffs of the formula

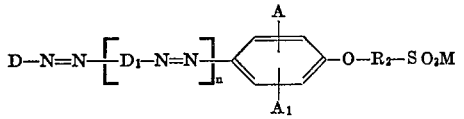

wherein $D_1$ is a phenylene group of the formula

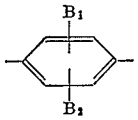

wherein $B_1$ and $B_2$ are each independently hydrogen, $C_{1-5}$-alkyl, $C_{1-5}$alkoxy, chloro or bromo, or $D_1$ is a group of the formula

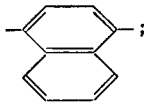

$n$ is 0 or 1; A and $A_1$ are each independently hydrogen, lower alkyl, lower alkoxy and halogen; $R_2$ is a straight chain alkylene of from 2 to 4 carbon atoms or said alkylene substituted by methyl or ethyl on not more than 2 carbon atoms of said alkylene; D is a residue of the benzene series, naphthalene or sulfonamidonaphthalene-1 or 2, said D being free from acid solubilizing groups; and D may also be a residue of the heterocyclic series when $n$ is 0; and M is hydrogen, alkali metal or ammonium.